(12) United States Patent
Zhou et al.

(10) Patent No.: US 8,498,292 B2
(45) Date of Patent: Jul. 30, 2013

(54) NETWORK NODE AND METHOD FOR ESTABLISHING NETWORK PATH AND SENDING DATA

(75) Inventors: Yuan Zhou, Shenzhen (CN); Wei Zhang, Shenzhen (CN); Danfeng Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 12/887,079

(22) Filed: Sep. 21, 2010

(65) Prior Publication Data

US 2011/0013509 A1    Jan. 20, 2011

Related U.S. Application Data

(63) Continuation of application No. PCT/CN2009/070770, filed on Mar. 13, 2009.

(30) Foreign Application Priority Data

Mar. 21, 2008    (CN) .......................... 2008 1 0066199

(51) Int. Cl.
     *H04L 12/28*    (2006.01)
(52) U.S. Cl.
     USPC ............................ 370/389; 370/225; 370/242
(58) Field of Classification Search
     USPC .................................. 370/406, 328, 338, 389
     See application file for complete search history.

(56) References Cited

U.S. PATENT DOCUMENTS

| 7,522,537 | B2 | 4/2009 | Joshi |
| 7,774,448 | B2 | 8/2010 | Shah-Heydari |
| 2006/0114850 | A1* | 6/2006 | Avinash ........................ 370/328 |
| 2007/0025274 | A1 | 2/2007 | Rahman et al. |
| 2007/0053309 | A1 | 3/2007 | Poojary et al. |
| 2007/0076730 | A1* | 4/2007 | Rahman et al. ............... 370/406 |
| 2007/0204046 | A1 | 8/2007 | Batta et al. |
| 2008/0170550 | A1* | 7/2008 | Liu et al. ....................... 370/338 |
| 2009/0080347 | A1 | 3/2009 | Ishii |

FOREIGN PATENT DOCUMENTS

| CN | 1747446 A | 3/2006 |
| CN | 1791113 A | 6/2006 |
| CN | 101047638 A | 10/2007 |

(Continued)

OTHER PUBLICATIONS

Office Action issued in corresponding European Patent Application No. 09722279.8, mailed Apr. 4, 2012.

(Continued)

*Primary Examiner* — Albert T Chou
(74) *Attorney, Agent, or Firm* — Brinks Hofer Gilson & Lione (57) ABSTRACT

The disclosure relates to the mesh network technology, and in particular, to a network node and a method for establishing a path and transmitting data. A method for establishing a network path is provided in an embodiment of the present invention. The method includes: receiving a gateway notification forwarded by a node with a trunk path and setting up a routing request timer; sending a routing request that contains information about whether a path is the trunk path after the routing request timer times out; receiving a route reply that is generated by the gateway after receiving the routing request from the gateway through the trunk path. In addition, a network node for implementing the method is provided in an embodiment of the present invention.

12 Claims, 9 Drawing Sheets

FOREIGN PATENT DOCUMENTS

| | | |
|---|---|---|
| CN | 101056240 A | 10/2007 |
| CN | 101069387 A | 11/2007 |
| CN | 101102283 A | 1/2008 |
| CN | 101110784 A | 1/2008 |
| CN | 1328750 A | 12/2011 |
| CN | 101540714 B | 2/2012 |
| WO | WO 0019677 A2 | 4/2000 |
| WO | 2006/098723 A1 | 9/2006 |
| WO | WO 2009/115020 A1 | 9/2009 |

OTHER PUBLICATIONS

Extended European Search Report issued in corresponding European Patent Application No. 09722279.8, mailed Feb. 14, 2011.

Bahr, "Update on the Hybrid Wireless Mesh Protocol of IEEE 802.11s", Siemens Corporate Technology, Information & Communications. IEEE 2007.

Bahr, "Proposed Routing for IEEE 802.11s WLAN Mesh Networks", Siemens Corporate Technology, Information & Communications. Aug. 6, 2006. XP-002469387.

Gao et al., "Load Balanced AODV—An Improvement of Performance and Fairness", IEEE 2007.

Joshi et al., "HWMP Specification", IEEE 802.11-06/1778r1, Nov. 2006. XP-002602060.

Office Action issued corresponding Chinese Patent Application No. 200810066199.2, mailed Sep. 1, 2010.

Written Opinion of the International Searching Authority issued in corresponding PCT Patent Application No. PCT/CN2009/070770, mailed Jun. 25, 2009.

Thompson, et al., "Flow Scheduling for End-host Multihoming", Department of Computer Science, University of Illinois at Urbana-Champaign.

Draft Standard for Information Technology—Telecommunications and information exchange between systems—Local and Metropolitan area networks—Specific Requirements—Part 11: Wireless LAN Medium Access Control (MAC) and Physical Layer (PHY) specifications. Amendment: Mesh Networking. IEEE P802.11s™/D1.09 CMP D1.08. 2008.

* cited by examiner

NETWORK NODE AND METHOD FOR ESTABLISHING NETWORK PATH AND SENDING DATA

CROSS-REFERENCE TO RELATED APPLICATIONS

This application is a continuation of International Application No. PCT/CN2009/070770, filed on Mar. 13, 2009, which claims priority to Chinese Patent Application No. 200810066199.2, filed on Mar. 21, 2008, both of which are hereby incorporated by reference in their entireties.

FIELD OF THE INVENTION

The present invention relates to the mesh network technology, and in particular, to a network node and a method for establishing a network path and sending data.

BACKGROUND

A mesh network is a wireless network that supports multi-hop transmission. The mesh technology is applicable to interconnection between infrastructures, between home appliances, and between user equipment and infrastructure. For interconnection between infrastructures, the mesh networking mode provides better error tolerance performance than cellular coverage. A Hybrid Wireless Mesh Protocol (HWMP) is a routing protocol in a mesh network. This routing protocol combines the proactive and reactive routing protocols to apply to a wireless mesh network whose topology is relatively static and a network whose topology is changed dynamically.

The process of creating a path by the HWMP is as follows: The HWMP routing protocol broadcasts a gateway notification message through a gateway node, also known as root node. This notification message carries the address, sequence number, and metric of the gateway. A non-gateway node in the network receives this gateway notification message, selects a latest sequence number and optimal metric of the gateway, and creates a path to the gateway. The non-gateway node unicasts a routing request that carries the information such as address and sequence number of the node to establish a downlink path to the gateway and forwards the gateway notification message. Another non-gateway node receives the routing request, creates a path to the source node in the routing request, and continues to unicast the routing request to the gateway node carried in the routing request. The gateway node receives the routing request, creates a path to the source node in the routing request, and sends a route reply. An intermediate forwarding node (non-destination node) receives the route reply, verifies the path created when receiving the gateway notification message, and continues to unicast the route reply. The destination node receives the route reply, and verifies the path information.

In a mesh network with multiple gateways, all non-gateway mesh nodes can have paths to each gateway. If no balancing policies are implemented between multiple gateways or paths, the load on nodes in the network is unbalanced. Consequently, partial nodes (including gateway nodes) may be congested while the resources on the other nodes are not efficiently utilized.

SUMMARY

A method for establishing a path is provided in an embodiment of the present invention to improve the load balancing rate among nodes in a network. The method includes:

receiving a gateway notification forwarded by a node with a trunk path and setting up a routing request timer;

sending a routing request after the routing request timer times out, where the routing request carries information about the trunk path; and receiving a route reply sent by the gateway through the trunk path, where the route reply is generated by a gateway after the gateway receives the routing request.

A network node is provided in an embodiment of the present invention. The network node includes:

a first receiving unit, configured to receive a gateway notification forwarded by a node with a trunk path;

a sending unit, configured to send a routing request after the first receiving unit receives the gateway notification and a routing request timer times out; and a second receiving unit, configured to receive a route reply sent by the gateway through the trunk path, where the route reply is generated by a gateway after the gateway receives the routing request.

A method for sending data is provided in an embodiment of the present invention. The method includes:

selecting a verified trunk path and sending data through trunk path when the data to be sent is data sent from a node to an external network; or selecting a verified path to forward data when the data is to be sent to an external network from a local network.

A method for handling a link fault is provided in an embodiment of the present invention. The method includes:

judging whether a path is connected to a gateway;

judging whether the path is a trunk path if the path is connected to the gateway; and triggering trunk path selection if the path is a trunk path to reselect a trunk path.

When the preceding method and network node are adopted, the common traffic control policies in the industry are implemented on a mesh source node in a network to ensure that the source node uses multiple paths in a load balancing manner if the source node sends packets to an external network. When the node forwards data from other nodes to the external network, the data is sent over the trunk path. During selection of the trunk path, load balancing factors are considered. For data sent from the gateway, the reverse path related to the uplink path is used to forward the data. Compared with the HWMP, this method balances the load in the network and increases the network throughput.

DETAILED DESCRIPTION

Figure 1:
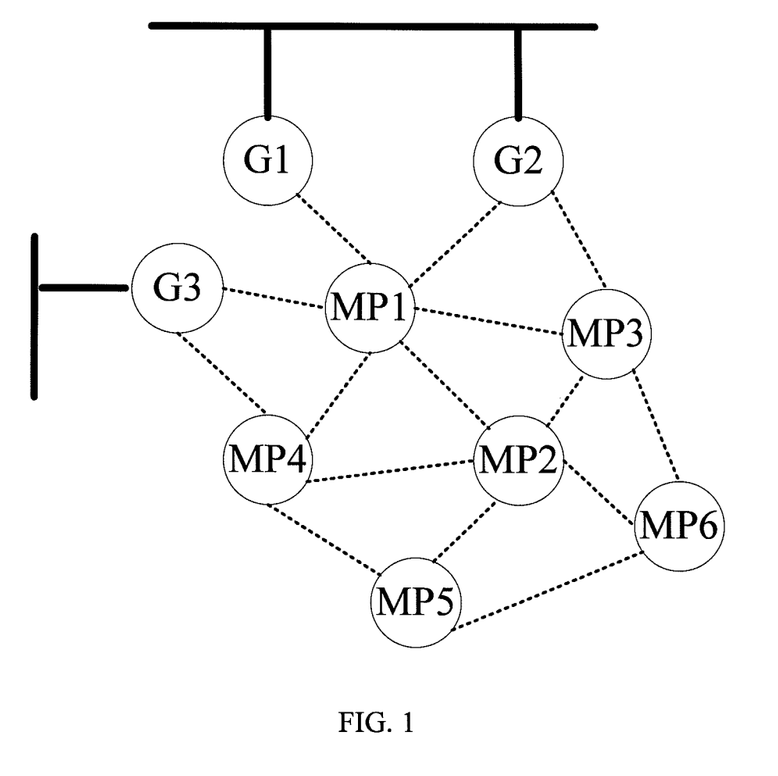
FIG. 1 shows a typical structure of a multi-gateway mesh network.

A balanced routing mechanism is designed for a mesh network in an embodiment of the present invention. FIG. 1 shows a typical mesh network in a multi-gateway scenario. Where, G1, G2, and G3 are gateway nodes, and other nodes are non-gateway nodes. For a non-gateway node, a path is selected among paths from such a node to a gateway as a trunk path, and information about the trunk path is recorded in a routing table.

The time of selecting the trunk path is as follows: A non-gateway node starts a trunk selection timer when receiving a first gateway notification. When the timer times out, trunk selection is triggered to select the trunk, path. Another implementation is as follows: A trunk selection timer is started when the current node is started, and trunk selection is triggered to select a trunk path when the timer times out.

The method for selecting the trunk path is as follows: randomly selecting a path as the trunk path according to the gateway address or next hop address in the path and the address of the local node device. Another implementation is as follows: randomly selecting a path from a list of paths with smallest layer numbers as the trunk path according to the gateway address or next hop address in the path and the address of the local node device, and specifically is: using the local address and a next hop address of each path with a smallest layer number to perform Exclusive-OR operation separately and marking a path with a largest result as the trunk path.

The layer number can be generated according to the minimum number of hops to the gateway. In addition, the layer number can be generated according to the empty time, or according to other accumulative path metric (a path metric equals the weighted sum of link metrics). If a layer number is generated according to the empty time, an embodiment for calculating the current layer number is provided as follows: Adding the current link metric to the layer number in the received packet, and dividing the result by 10 ms (the experience value of the empty time between two neighbor nodes provided in 802.11s). Then, round up the result to obtain the current layer number.

A method for establishing a network path is provided in an embodiment of the present invention. The method includes:

Step 001: A gateway notification forwarded by a node with a trunk path is received and a routing request timer is set up.

Step 002: A routing request that carries information about the trunk path is sent after the routing request timer times out.

Step 003: A route reply, which is generated by a gateway after the gateway receives the routing request and is sent by the gateway through the trunk path, is received.

Before step 001, a path is selected from paths connected to a current node as a trunk path, and information about the trunk path is recorded in a routing table. The procedure for selecting a trunk path from paths connected to the current node includes:

starting a trunk selection timer when receiving a first gateway notification, and triggering trunk selection to select a trunk path after the timer times out; or starting a trunk selection timer after the current node is started and triggering trunk selection after the timer times out to select a trunk path.

FIG. 1 shows a process of creating a path in an embodiment of the present invention.

A gateway node periodically broadcasts a gateway notification in the following way: After the gateway node is started, a periodical gateway notification timer is started. After the timer times out, the gateway node broadcasts the gateway notification.

A non-gateway node receives and handles the gateway notification forwarded by a node with a trunk path and triggers setup of a routing request timer.

When the routing request timer times out, the current non-gateway node sends a routing request that carries information that indicates whether a path is the trunk path to the gateway node through the trunk path.

After receiving the routing request from the non-gateway node, the gateway node generates a route reply and sends the route reply to the non-gateway node.

When the non-gateway node receives a route reply matching the local node through the trunk path, the path setup is complete.

The following table describes the structure of the gateway notification data frame.

| ID | Length | Flags | TTL | Source Address | Source Sequence Number | Metric | Layer Number |
|----|--------|-------|-----|----------------|------------------------|--------|--------------|

ID: sequence number of the gateway notification data frame;
Length: the frame length;
Flags: the flag;
TTL: survival period;
Source Address: the source address;
Source Sequence Number: sequence number of the source node that sends the routing request;
Metric: the metric; and
Layer Number: the layer number.

The following table describes the structure of the routing request frame.

| ID | Length | Flags | TTL | PREQ ID | Source Address | Source Sequence Number | Metric |
|----|--------|-------|-----|---------|----------------|------------------------|--------|

ID: sequence number of the gateway notification data frame;
Length: the frame length;
Flags: one bit in Flags indicates whether this routing request is a trunk request (this embodiment takes bit3 as an example, and value 1 of bit3 indicates a trunk request); another bit in Flags indicates whether to request for a path to any gateway (this embodiment takes bit7 as an example, and value 1 of bit7 means to request for a path to any gateway);
PREQ ID: sequence number of the routing request;
Source Address: Media Access Control (MAC) address of the source node that sends the routing request; and
Source Sequence Number: sequence number of the source node that sends the routing request, and the initial value of Metric is 0. It can be seen that a routing request has a flag that indicates whether the routing request is a trunk request.

The following table describes the structure of the route reply data frame.

| ID | Length | Flags | TTL | Dest Addr | Dest Sequence Number | Metric | Source Address |
|----|--------|-------|-----|-----------|----------------------|--------|----------------|

ID: sequence number of the route reply data frame;
Length: frame length;
Flags: its meaning is the same of the meaning of Flags in a routing request (that is, bit3 indicates whether it is a trunk request and bit7 indicates whether to request for a path to any path);
Dest Addr: destination address of the route reply;
Dest Sequence Number: sequence number of the destination node; and
Metric: the initial value is 0; and
Source Address: MAC address of the source node that sends the route reply.

Figure 2A:
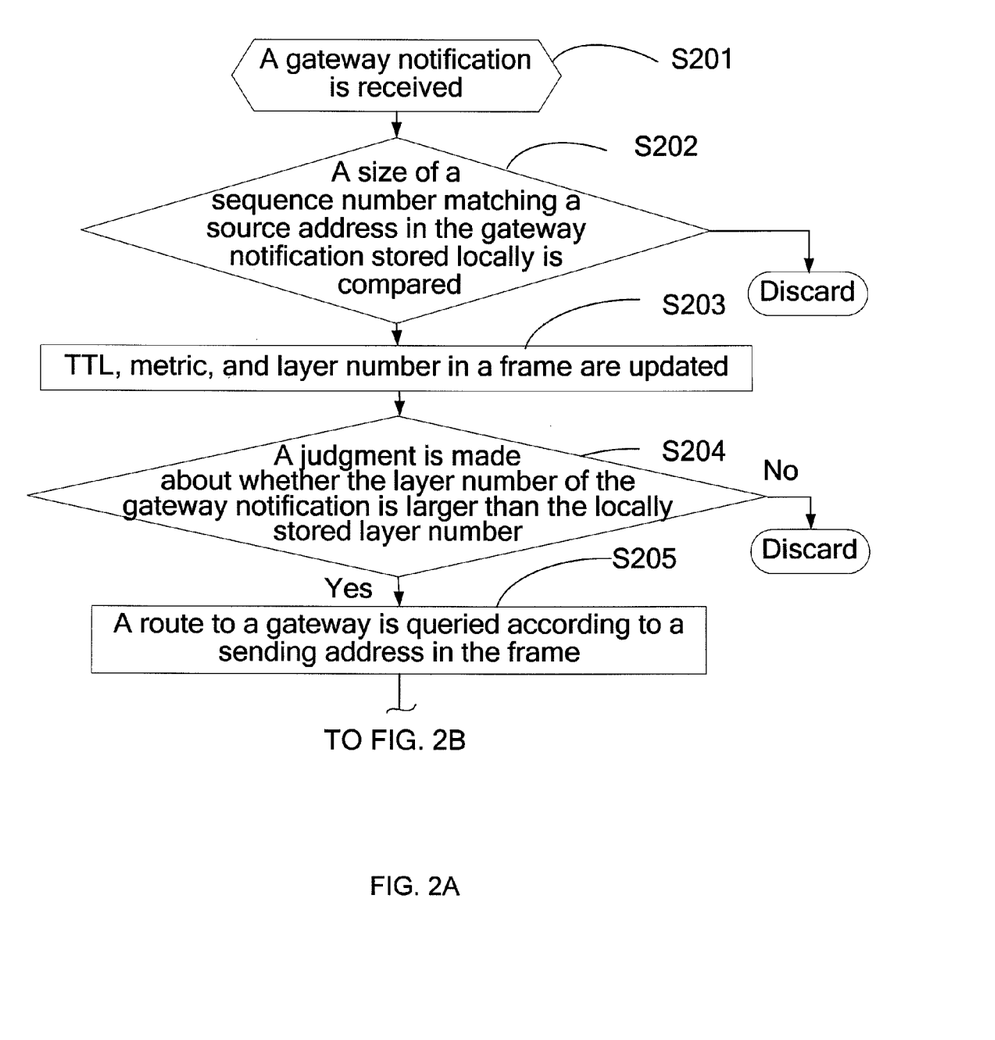
FIG. 2 is a flowchart of handling a gateway notification in an embodiment of the present invention.
Figure 2B:
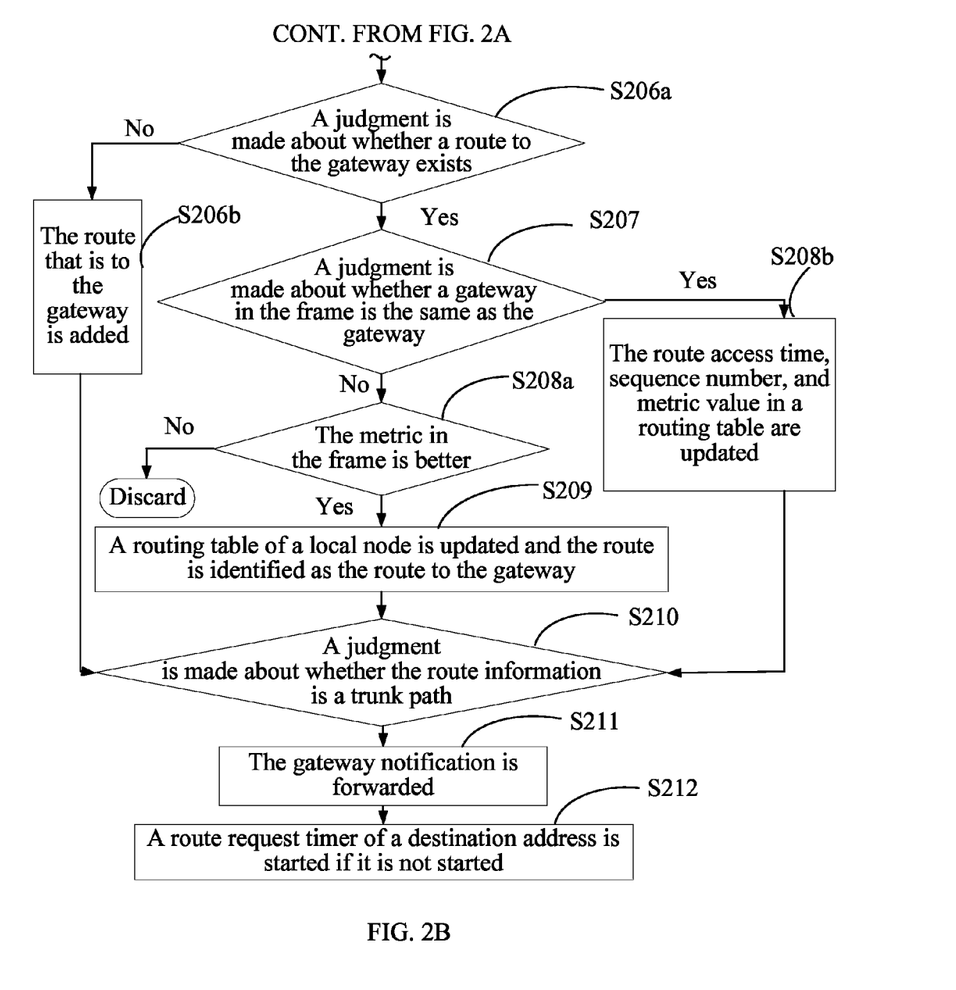

FIG. 2 shows the process of receiving and handling, by the non-gateway node, the gateway notification through the trunk path, and triggering setup of the routing request timer. The process includes:

Step 201: A gateway notification is received.

Step 202: A judgment is made about whether a sequence number in the gateway notification is smaller than the sequence number matching a source address of a locally saved gateway notification; if yes, step 203 is performed to forcibly update relevant values; otherwise, the gateway notification is discarded.

Step 203: TTL, metric, and layer number in the gateway notification are updated in the following way: the TTL minus 1, a metric of a last hop link is added to the metric, and the layer number is increased by 1.

Step 204: A judgment is made about whether the layer number in the gateway notification is larger than a locally saved layer number. If yes, step 205 is performed to forcibly update relevant values; otherwise, the gateway notification is discarded.

Step 205: A route to a gateway is queried according to a sending address in the gateway notification.

Step 206a: Step 206b is performed to add the route item to a routing table if the route does not exist. The route item is a route to the gateway and is marked as non-verified. Then, step 210 is performed. If the route item matching the updated gateway notification exists on the local node, step 207 is performed.

Step 207: A judgment is made about whether a gateway in a frame is the same as a gateway in a local routing table. If a gateway in a frame is different from a gateway in a local routing table, step 208a is performed; if a gateway in a frame is the same as a gateway in a local routing table, step 208b is performed.

Step 208a: A judgment is made about whether the metric value in the frame is larger than the metric value of the gateway reached through the sending address from the local node. If the metric value in the frame is larger than the metric value of the gateway reached through the sending address from the local node, the gateway notification is discarded; if the metric value in the frame is smaller than the metric value of the gateway reached through the sending address from the local node, step 209 is performed.

Step 208b: The routing table on the local node is updated. The route flag is marked in a way to identify the route item as a route to the gateway. The sequence number, metric value, and access time in the route are updated. Then, step 209 is performed.

Step 209: The address and sequence number of the gateway and the metric value in the routing table are updated. The flag is marked with the route information that the route item is a route to the gateway.

Step 210: A judgment is made about whether the route item with the route information is a trunk path. If yes, step 211 is performed; otherwise, step 212 is performed.

Step 211: The gateway notification is forwarded according to the route information continuously.

Step 212: A routing request timer of sending a destination address is started if it is not started.

Figure 3:
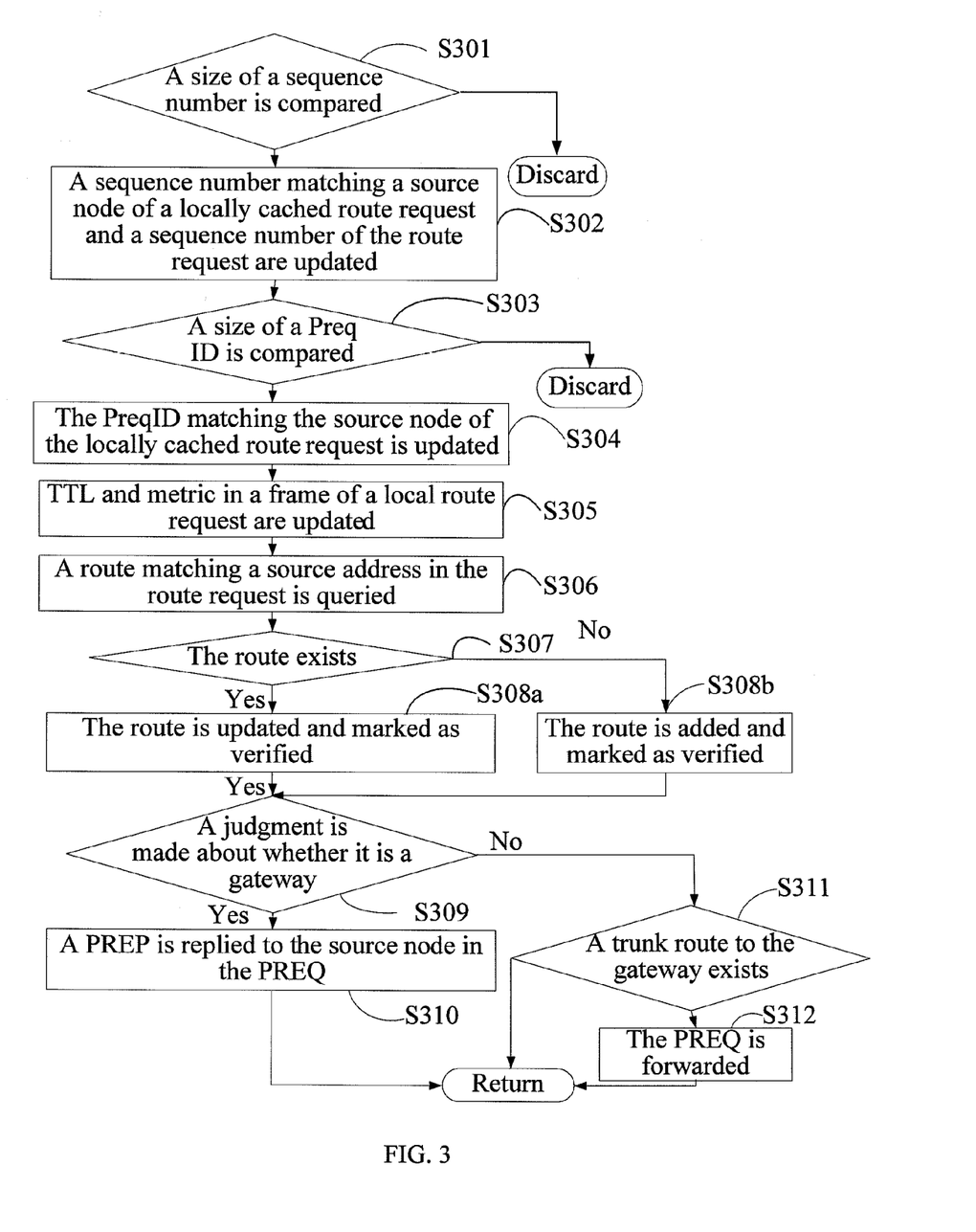
FIG. 3 is a flowchart of handling a routing request in an embodiment of the present invention.

Through the preceding processing, after the current node receives the gateway notification through the trunk path and the routing request timer times out, the current node sends a routing request that carries the information about whether the path is a trunk path. Then, the current node sends the routing request to the gateway that initiates the gateway notification. FIG. 3 shows the handling process after the node receives the routing request:

Step 301: A judgment is made about whether a sequence number carried in the received routing request is smaller than a sequence number matching a source address of the routing request in a local cache. If a sequence number carried in the received routing request is smaller than a sequence number matching a source address of the routing request in a local cache, the received routing request is discarded; if a sequence number carried in the received routing request is larger than a sequence number matching a source address of the routing request in a local cache, step 302 is performed to forcibly update relevant values.

Step 302: The sequence number and PreqID matching the source node of the locally cached routing request are updated.

Step 302: A judgment is made about whether a PreqID carried in the received routing request is smaller than a PreqID matching the source address of the routing request in the local cache. If a PreqID carried in the received routing request is smaller than a PreqID matching the source address of the routing request in the local cache, the received routing request is discarded; a PreqID carried in the received routing request is larger than a PreqID matching the source address of the routing request in the local cache, step 304 is performed to forcibly update relevant values.

Step 304: The PreqID matching the source node of the routing request in the local cache is updated.

Step 305: The TTL and metric value in the local routing request frame are updated as follows: the TTL minus 1, and a link metric is added to the metric value.

Step 306: A route item matching the source address of the received routing request is searched from route information on the local node.

Step 307: If the route item exists, step 308a is performed; otherwise, step 308b is performed.

Step 308a: If relevant values are forcibly updated, the route item is updated, including the sequence number, next hop, metric value, and access time. Otherwise, the metric in the routing request and the metric in the route item are compared. If the metric in the routing request is smaller, the route item is updated; otherwise, the routing request is discarded.

Step 308b: The route item is added and marked as verified.

Step 309: A judgment is made about whether the current node is a gateway node. If yes, step 310 is performed; if not, step 311 is performed.

Step 310: A route reply is sent to the source address of the routing request.

Step 311: A judgment is made about whether the current device has a trunk path to the gateway node. If not, the routing request is discarded; if yes, step 311 is performed.

Step 312: The routing request is forwarded through the trunk path.

Figure 4:
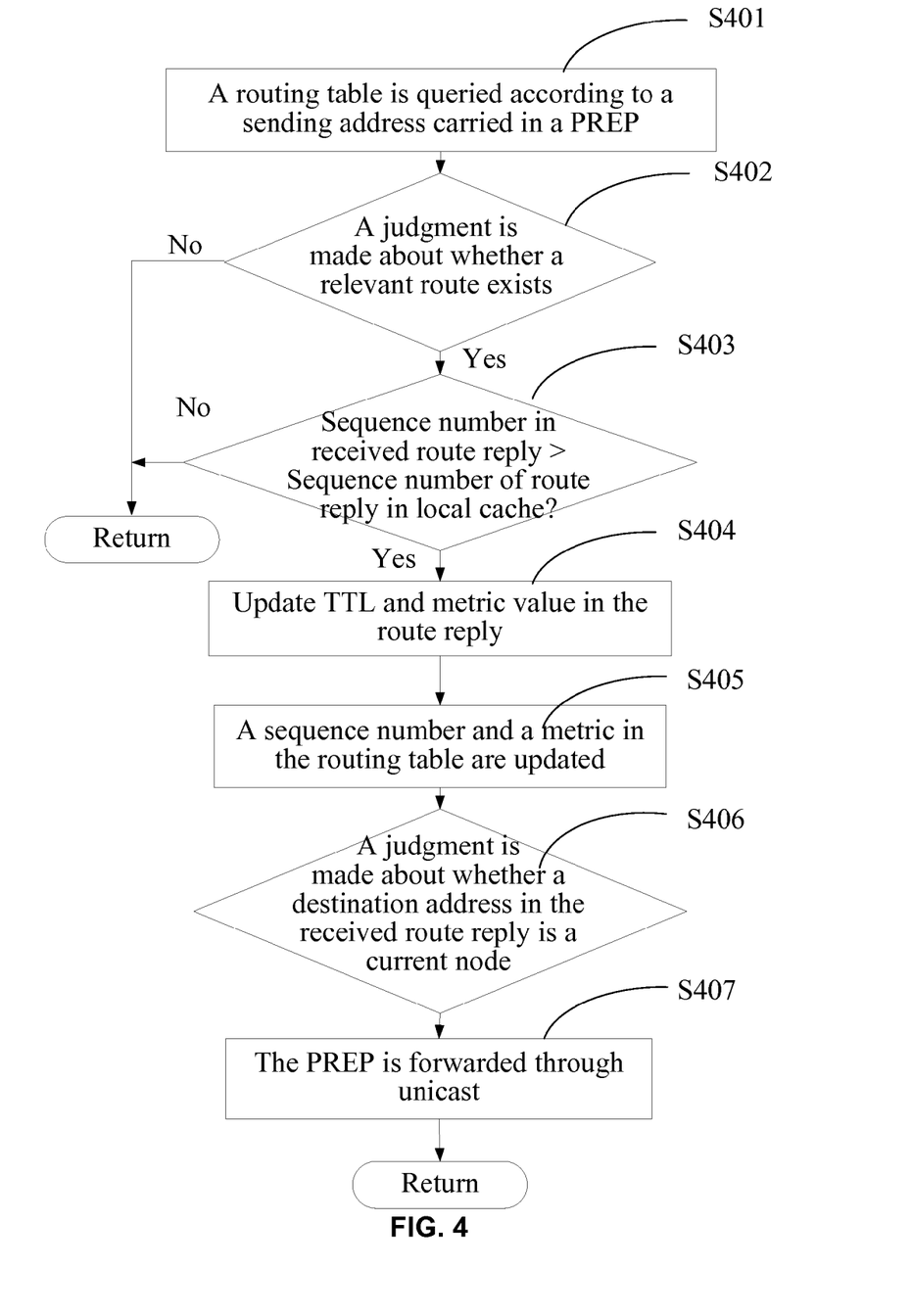
FIG. 4 is a flowchart of handling a route reply in an embodiment of the present invention.

After receiving the routing request, the gateway generates a route reply and sends the route reply along the trunk path to the non-gateway node that sends the routing request. FIG. 4 shows the handling process of the non-gateway node after the non-gateway node receives the route reply sent from the gateway:

Step 401: A routing table is queried according to the sending address carried in the received route reply. The routing table contains information about the trunk path.

Step 402: If a relevant route item is found, step 403 is performed; if no relevant route item is found, the received route reply is discarded.

Step 403: A judgment is made about whether a sequence number in the received route reply is larger than a sequence number matching a destination address of the route reply in the local cache. If the sequence number in the received route reply is larger than or equal to the sequence number saved in the local cache, the route reply is discarded; if the sequence number in the received route reply is smaller than the sequence number saved in the local cache, step 404 is performed.

Step 404: The TTL and metric value in the route reply are updated as follows: The TTL minus 1 and the metric of the receiving link is added to the metric value.

Step 405: The sequence number and metric value in the routing table are updated, and the route is marked as verified.

Step 406: A judgment is made about whether the destination address in the received route reply is the current node. If not, step 407 is performed to forward the route reply; if yes, it indicates that the path between the current node and the gateway node is established.

The common traffic control policies in the industry are implemented on a mesh source node in a network to ensure that the source node uses multiple paths in a load balancing manner if the source node sends data packets to an external network. When the node forwards data from other nodes, the data is sent along the trunk path. During selection of the trunk path, load balancing factors are considered. Compared with the HWMP, this method balances the load in the network and increases the network throughput.

Figure 5:
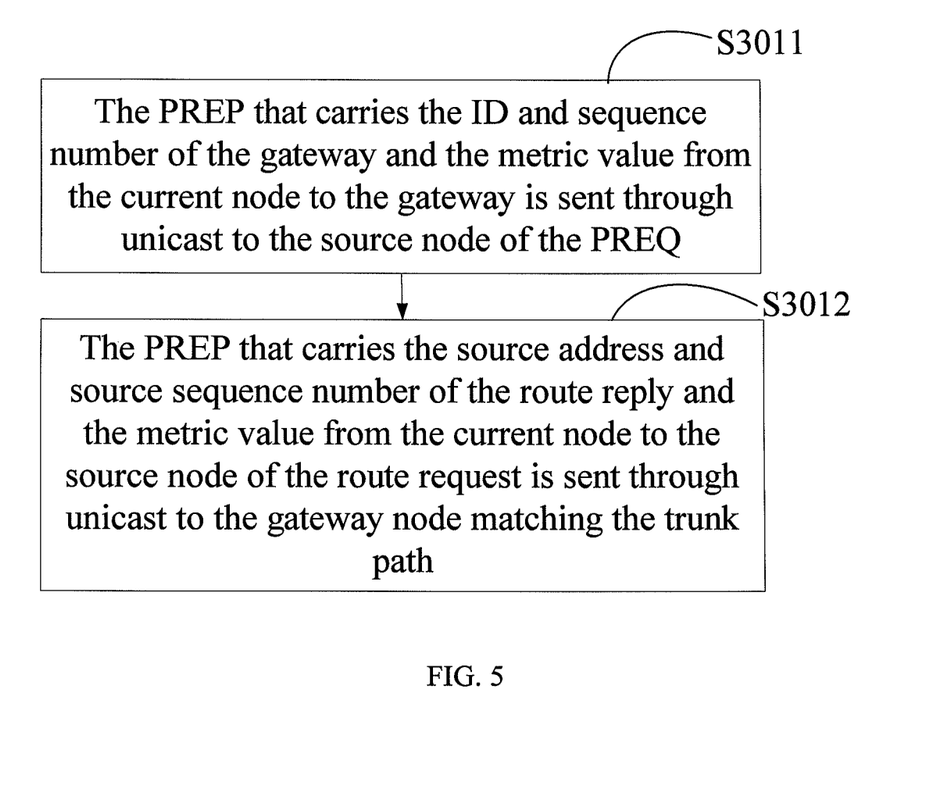
FIG. 5 is a flowchart of a first embodiment in step 310 in an embodiment of the present invention.

Another embodiment of step 310 is provided. As shown in FIG. 5, specifically, step 311 includes:

Step 3011: The route reply is sent through unicast to the source node of the routing request. The route reply carries the ID and sequence number of the gateway and the metric value from the current node to the gateway.

Step 3012: The route reply is sent through unicast to the gateway node matching the trunk path. The route reply carries the source address and source sequence number of the routing request and the metric value from the current node to the source node of the routing request.

The following table describes the format of the gateway notification frame in the second embodiment of the present invention.

| ID | Length | Flags | TTL | Source Address | Source Sequence Number | Metric | Last-hop Number | Last-hop Address |
|---|---|---|---|---|---|---|---|---|

A last hop address is added to the gateway notification frame.

Figure 6:
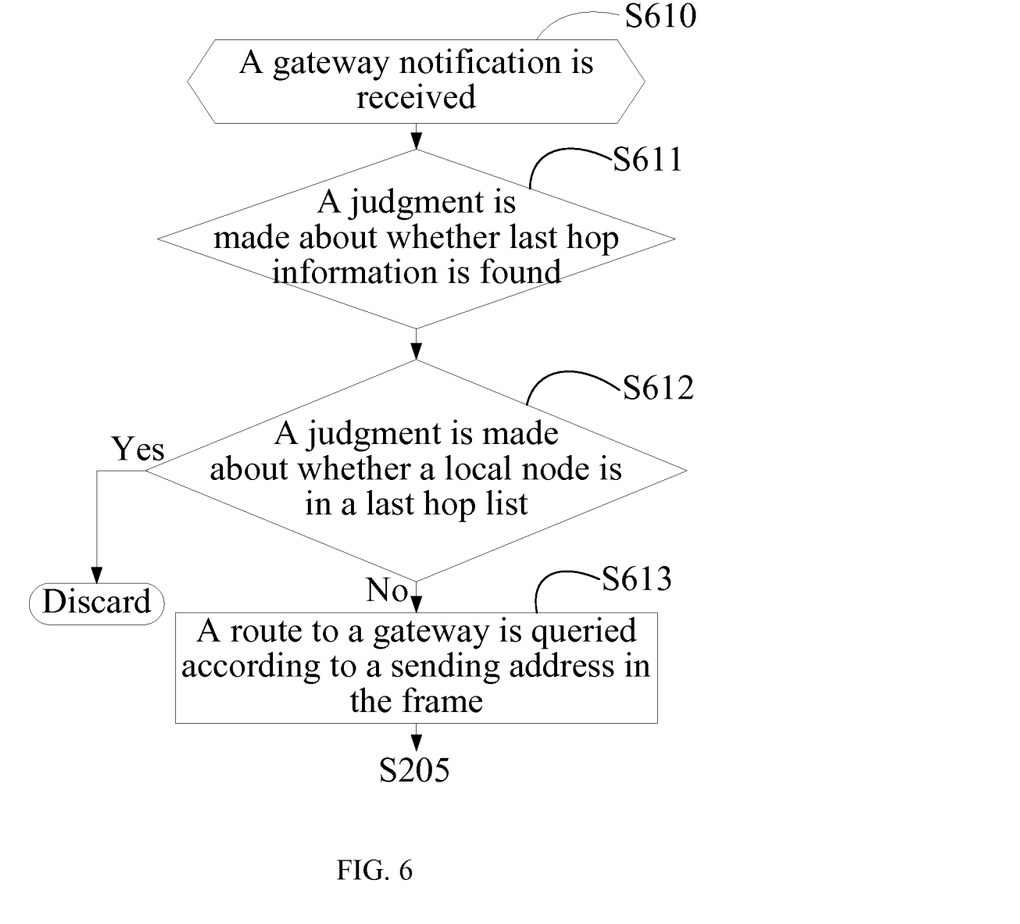
FIG. 6 is a flowchart of a second embodiment of handling a gateway notification in an embodiment of the present invention.

FIG. 6 shows a process of handling a gateway notification in this embodiment:

Step 610: A gateway notification is received.

Step 611: Last hop information is searched. If last hop information is found, step 612 is performed; if no last hop information is found, step 613 is performed.

Step 612: A judgment is made about whether information about the current node is included in a last hop list. If yes, the gateway notification is discarded; if not, step 613 is performed.

Step 613: A route to a gateway is queried according to a source address in the gateway notification. Then, step S205 is performed.

In this embodiment, after the route item of the trunk path is selected, the last hop list, metric value, and TTL in the gateway notification are updated and then the gateway notification is forwarded.

Figure 7:
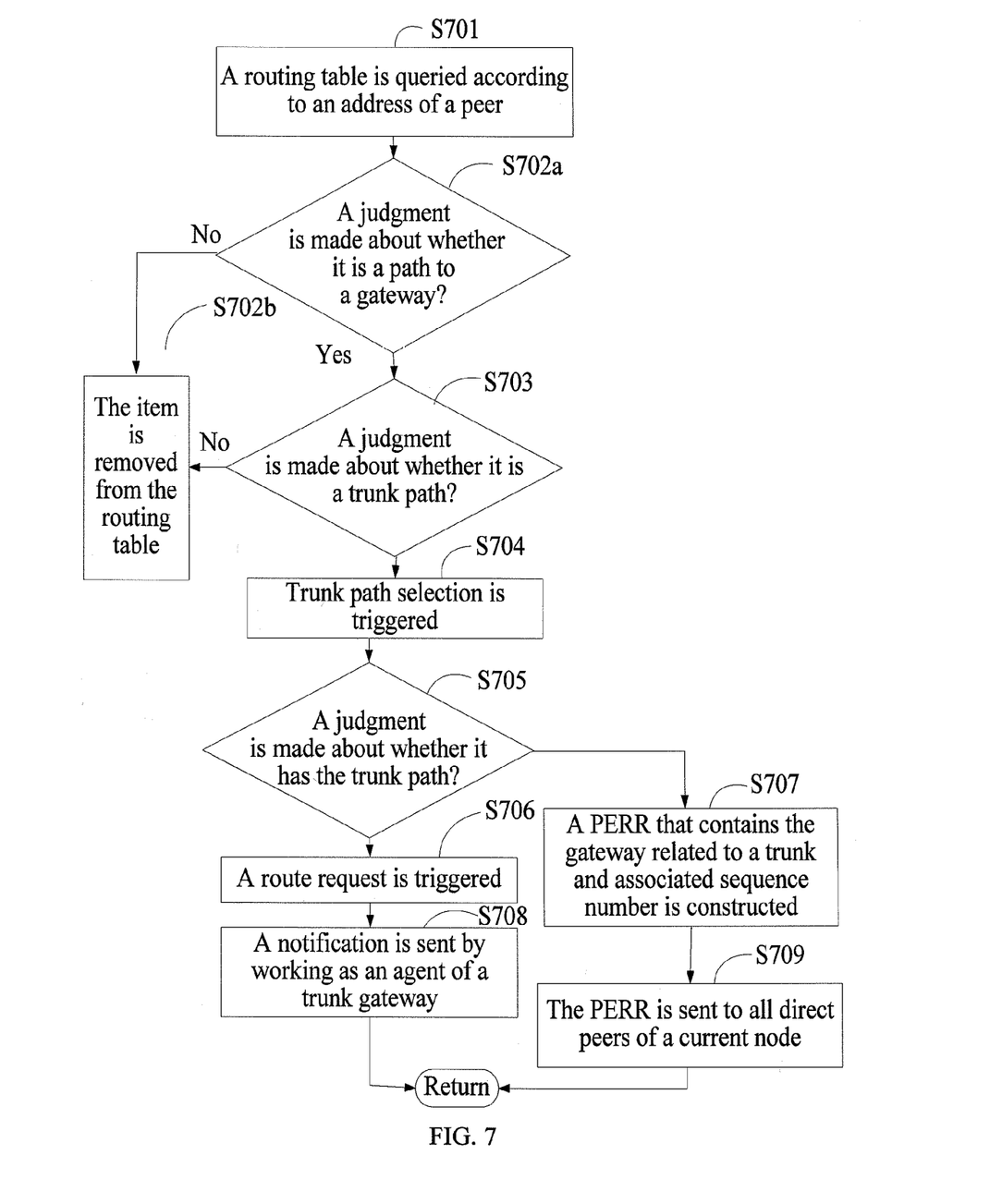
FIG. 7 is a flowchart of handling a link break in an embodiment of the present invention.

A link fault handling process is provided in an embodiment of the present invention. FIG. 7 is a flowchart of handling a link break in an embodiment of the present invention. The process includes:

Step 701: When a link break is detected, a current node searches a routing table according to an opposite node address.

Step 702*a*: A judgment is made about whether a path is a path to a gateway. If not, step 702*b* is performed to delete the route item of the faulty link from the routing table; if yes, step 703 is performed.

Step 703: A judgment is made about whether the link is a trunk path. If not, the route item of the faulty link is removed from the routing table; if yes, step 704 is performed.

Step 704: Trunk path selection is triggered.

Step 705: A judgment is made about whether to select the trunk path. If no trunk path exists, step 708 is performed. If the trunk path exists, step 706 is performed.

Step 706: A routing request is triggered.

Step 707: A notification is sent by working as an agent of a trunk gateway.

Step 708: A path error packet (PERR) is constructed, where the PERR includes the gateway and relevant sequence number matching the trunk path. Then, step 709 is performed.

Step 709: The PERR is sent to all direct opposite nodes of the current node.

A method for handling a link fault is provided in an embodiment of the present invention. The method includes:

determining whether a path is connected to a gateway;

determining whether the path is a trunk path if the path is connected to the gateway;

triggering trunk path selection if the path is a trunk path to reselect a trunk path;

selecting a path from paths connected to a current node as a trunk node and records information about the trunk node in a routing list; and constructing a PERR that contains information about the trunk path when no trunk path is selected, and sending the PERR to all direct opposite nodes of a current node; or, triggering a routing request to send a gateway notification by serving as an agent of a trunk gateway if the trunk path is selected.

Those killed in the art can complete all or part of the steps in the preceding method by using a program to instruct the hardware. The program may be stored in a storage medium that can be read by a computer. The procedure for executing the program may include the following steps: receiving a gateway notification forwarded by a node with a trunk path and setting up a routing request timer; sending a routing request that carries information about the trunk path after the routing request timer times out; and receiving a route reply that is sent by the gateway through the trunk path. The storage medium can be disk tape, compact disk, Read-Only Memory (ROM), or Random Access Memory (RAM).

A method for transmitting data is provided in an embodiment of the present invention. A packet contains a receiving address, a sending address, a mesh source address, a mesh destination address, and a destination address.

When data is sent from a non-gateway node to a gateway node, that is, data is sent to an external network, a judgment is made about whether the data to be sent is locally generated. If the data is received from other nodes and forwarded by the current node to the gateway node, a verified trunk path is selected for forwarding. When the current node sends local data to the gateway, a traffic forwarding policy is adopted if multiple verified paths to the gateway are available. The forwarding policy may be as follows: Each verified path forwards the same number of data streams, and each data stream is identified by using a source IP address and a destination IP address.

When data is sent from the gateway to a node in the network, that is, data is sent inwardly, the current node uses a reverse path of the path for sending data from a non-gateway node to the gateway node. If the reverse path does not exist, a traffic policy is adopted to select a path to forward the data. The policy requires that an export gateway maintains all the paths information from the gateway to the mesh node.

Data sent from an external network is sent to the export gateway of the node. The gateway sends the data to the external gateway corresponding to the related path according to the path information. After receiving the data, the external gateway uses a single path to send the data to the node if the single path exists; otherwise, the external gateway sends the data to the node by using the traffic policy.

Figure 8:
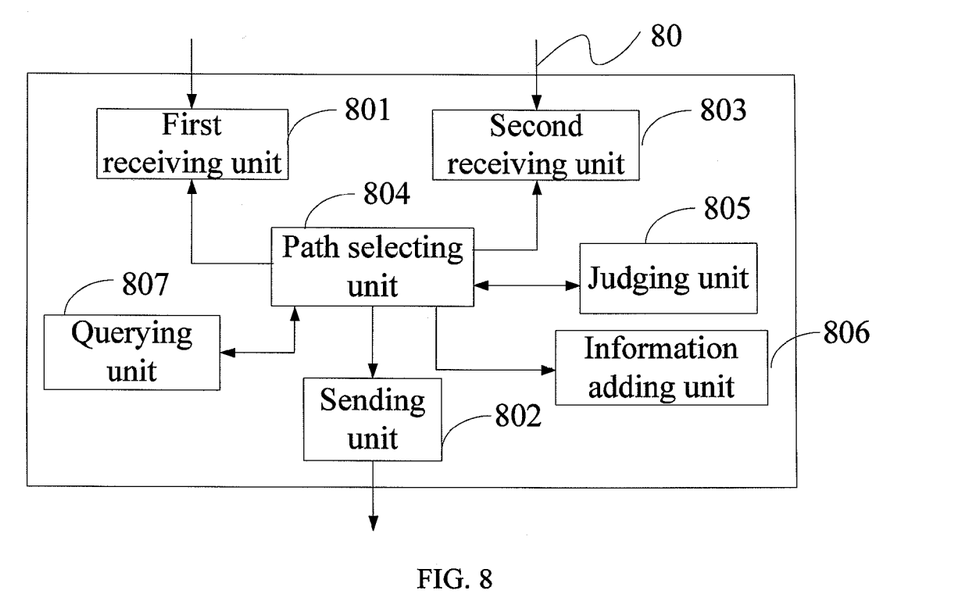
FIG. 8 shows a structure of a node device in an embodiment of the present invention.

A network node device for implementing the preceding method is provided in an embodiment of the present invention. As shown in FIG. 8, a network node device 80 is provided, including:

a first receiving unit 801, configured to receive a gateway notification forwarded by a node with a trunk path;

a sending unit 802, configured to send a routing request after the first receiving unit receives the gateway notification and a routing request timer times out; and a second receiving unit 803, configured to receive a route reply sent by the gateway through the trunk path, where the route reply is generated by a gateway after the gateway receives the routing request;

a path selecting unit 804, configured to select a path from paths connected to a current node as a trunk node;

a judging unit 805, configured to judge whether information about a route matches information about the trunk path;

an information adding unit 806, configured to add information about the trunk path into the routing request; and a querying unit 807, configured to query route information in a routing table, including route information of the gateway that sends the gateway notification and route information of sending the routing request.

The process of selecting a path by the path selecting unit is as follows: randomly selecting a path as the trunk path according to the gateway address or next hop address in the path and the address of the local node device. Another implementation is as follows: randomly selecting a path from a list of paths with smallest layer numbers as the trunk path according to the gateway address or next hop address in the path and the address of the local node device, and specifically is using the local address and a next hop address of each path with a smallest layer number to perform Exclusive-OR operation separately, and marking a path with a largest result as the trunk path.

When the preceding method and network node are adopted, the common traffic control policies in the industry are implemented on a mesh source node in a network to ensure that the source node uses multiple paths in a load balancing manner if the source node sends packets to an external network. When the node forwards data from other nodes to the external network, the data is sent over the trunk path. During selection of the trunk path, load balancing factors are considered. For data sent from the gateway, the reverse path related to the uplink path is used to forward the data. Compared with the HWMP, this method balances the load in the network and increases the network throughput.

What is claimed is:

1. A method for establishing a network path, comprising a network node device, performing:
receiving a gateway notification forwarded by a node with a trunk path and setting up a routing request timer, wherein the trunk path is selected from paths connected to a current node, wherein the selecting comprising:
recording information about the trunk path in a routing table; and
using a local address and a next hop address of each path with a smallest layer number to perform Exclusive-OR operation separately and marking a path with a largest result as the trunk path;
sending a routing request after the routing request timer times out, where the routing request carries information about the trunk path; and
receiving a route reply sent by a gateway through the trunk path, where the route reply is generated by the gateway, after the gateway receives the routing request.

2. The method according to claim 1, wherein the selecting of the path from paths connected to the current node as the trunk path comprising the network node device, performing:
starting a trunk selection timer on receiving a first gateway notification, and triggering trunk selection to select the trunk path when the trunk selection timer times out; or
starting the trunk selection timer when the current node is started, and triggering the trunk selection to select the trunk path when the trunk selection timer times out.

3. The method according to claim 1, wherein the carrying of information about the trunk path in the routing request comprising:
adding a flag in the routing request to record the routing request as a trunk request.

4. The method according to claim 1, wherein the selecting of the path from the paths connected to the current node as the trunk path comprising:
randomly selecting the path as the trunk path according to a gateway address or next hop address in the path and an address of a local node device.

5. The method according to claim 1, wherein the receiving of the gateway notification forwarded by the node with the trunk path comprising:
querying for and finding information about a route to the gateway that sends the gateway notification; and
judging whether the route information is information about the trunk path, and forwarding the gateway notification according to the route information and starting the routing request timer corresponding to an address of the gateway if the route information is the information about the trunk path.

6. A network node, comprising:
a first receiving unit, configured to receive a gateway notification forwarded by a node with a trunk path and set up a routing request timer, wherein the trunk path is selected from paths connected to a current node, wherein the trunk path is selected in accordance to:
recorded information about the trunk path in a routing table; and
a local address and a next hop address of each path with a smallest layer number to perform Exclusive-OR operation separately, and marking a path with a largest result as the trunk path;
a sending unit, configured to send a routing request to a gateway when the first receiving unit receives the gateway notification and the routing request timer times out; and
a second receiving unit, configured to receive a route reply sent by the gateway through the trunk path, where the route reply is generated by the gateway after the gateway receives the routing request.

7. The node according to claim 6, further comprising:
a path selecting unit, configured to select a path from paths connected to a current node as the trunk path.

8. The node according to claim 6, further comprising:
an information adding unit, configured to add information about the trunk path into the routing request.

9. The node according to claim 7, further comprising:
a judging unit, configured to judge whether information about a route matches information about the trunk path; and
a querying unit, configured to query for route information in a routing table, including route information to the gateway that sends the gateway notification and route information of sending the routing request.

10. A method for handling a link fault, comprising:
when a link break is detected, searching by a network node device, a routing table according to an opposite node address;
judging by the network node device, whether a path is connected to a gateway;
judging by the network node device, whether the path is a trunk path if the path is connected to the gateway; and
triggering by the network node device, a trunk path selection if the path is a trunk path, wherein the trunk path is selected from paths connected to a current node, wherein the selecting comprising:
   recording information about the trunk path in a routing table; and
using a local address and a next hop address of each path with a smallest layer number to perform Exclusive-OR operation separately and marking a path with a largest result as the trunk path; and
reselecting the trunk path utilizing the above selecting steps.

11. The method according to claim 10, further comprising:
constructing by the network node device, a Path Error packet (PERR) if no trunk path is selected, where the PERR contains the information about the trunk path; and
sending by the network node device, the PERR to all direct opposite nodes of the current node.

12. The method according to claim 10, further comprising:
triggering by the network node device, a routing request and sending a gateway notification by serving as an agent of a trunk gateway if the trunk path is selected.

* * * * *